A. C. SCHUERMANN.
SLIP JOINT COUPLING NUT.
APPLICATION FILED OCT. 26, 1911.
1,063,926.
Patented June 3, 1913.
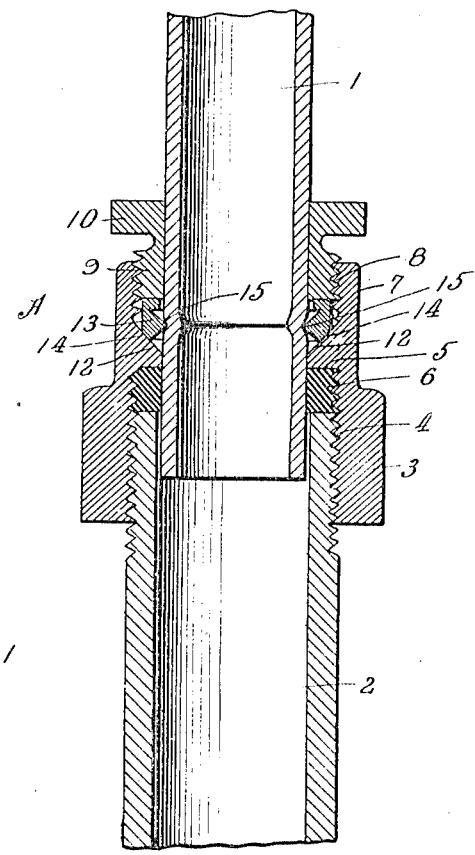

UNITED STATES PATENT OFFICE.

ANTON C. SCHUERMANN, OF DECATUR, ILLINOIS, ASSIGNOR TO H. MUELLER MFG. CO., OF DECATUR, ILLINOIS, A CORPORATION OF ILLINOIS.

SLIP-JOINT-COUPLING NUT.

1,063,926. Specification of Letters Patent. Patented June 3, 1913.

Application filed October 26, 1911. Serial No. 656,910.

*To all whom it may concern:*

Be it known that I, ANTON C. SCHUERMANN, a citizen of the United States, residing at Decatur, in the county of Macon and State of Illinois, have invented new and useful Improvements in Slip-Joint-Coupling Nuts, of which the following is a specification.

My present invention relates to certain new and useful improvements in slip joint coupling nuts especially designed for uses wherein it is desired to couple together two telescoping pipe sections, as for instance a service and a supply-pipe, or a supply-pipe and faucet-spud or tail-piece, or both, the object of the invention being to provide a coupling that will effectually prevent "blow-outs".

In the prior constructions with which I am acquainted and wherein an attempt has been made to prevent "blow-outs" in the pipe connections, it is the usual practice to provide the telescoping pipe-section with a fixed collar, which forms a part of the pipe itself, and which collar constitutes a shoulder serving as a stop or abutment for the coupling nut. Such collar construction serves the purpose for which it is intended, but is objectionable because the extent or degree of penetration of one pipe within the other is fixed and limited, thus preventing adjustments being made between the pipes which adjustments are almost always required owing to variations in the different installations, especially where connection is being made between a supply-pipe and a service-pipe, or between a supply-pipe and faucet-spud or tail-piece, or between the opposite ends of a supply-pipe and a service-pipe and faucet-spud or tail-piece respectively.

According to the present invention I provide a coupling-nut which carries a locking-ring or collar that permits free adjustable penetration of one pipe within another and which ring or collar may be caused to grip or grasp one of the pipes in such a manner as to form, in effect, a fixed collar, such as will, with the aid of the coupling nut, securely couple the two pipe-sections in adjustable relationship and obviate any liability of blow-outs.

In the accompanying drawing which is illustrative of a preferred embodiment of the invention, Figure 1, is a plan view of the several parts comprising my improved coupling nut, the parts being separated. Fig. 2, is a longitudinal sectional view of the coupling nut shown in applied position. Fig. 3, is a plan view of the locking ring or collar, and Fig. 4, is a longitudinal sectional view showing the use of my improved coupling-nut in connection with a common form of supply pipe, the latter being coupled at its opposite ends to a faucet-spud or tail-piece and a service pipe respectively.

In the said drawing the reference numeral 1, designates a pipe section, as for instance, a supply-pipe, which is shown as telescoping into another pipe, 2, as for instance a service-pipe, faucet-spud or tail-piece, the end of said pipe 2, being externally threaded as shown.

The reference letter A', designates generally, my improved coupling nut which comprises a nut 3, having the usual wrench-gripping faces and which is interiorly threaded as shown at 4, whereby said nut may be screwed onto a pipe section such as 2. Within the nut there is a shoulder 5, forming a seat for a packing ring 6, interposed between said shoulder and the end of the pipe 2, in order to make a fluid-tight joint at the point where the packing-ring embraces the telescoping pipe, as indicated by the reference numeral 1. The said nut 3, is provided with an extension 7, internally threaded at its outer end, as at 8, to receive the threaded portion 9, of a follower-nut 10, and at the base of said threaded portion 8, there is formed an annular beveled seat 12, which is located opposite to, but in line with the said packing-ring-shoulder or seat 5. Resting upon and supported by the said beveled annular seat 12, is a split-metal ring or collar 13, preferably having a beveled wall 14, which contacts with the said beveled seat 12, said beveled seat and beveled wall 14 serving to cause the split ring 13, to contract under pressure exerted thereupon by the follower nut 10, and firmly grip the pipe section 1, and thus hold the two pipe sections 1, and 2, against longitudinal separation.

In order to cause the split ring or collar 13, to more firmly grip the pipe-section 1, I prefer to provide the same with one or more biting edges or portions 15, which edges or portions will, when the ring or collar is caused to contract under the force of the follower-nut, bite into the wall of the pipe-section 1, which is usually of annealed tubing, as when the pipe section is a commercial supply-pipe, and become, what is to all intents and purposes a fixed collar.

My improved coupling-nut will be made of standard sizes to fit the standard sized service-pipes and faucet-spuds or tail-pieces now found upon the market and as already installed, thus it will be possible, with my improvement, to make a practically blow-out-proof connection at either one or both ends of the supply-pipe and at the same time enable proper penetration adjustments to be made between the pipes. Again, as shown in Fig. 4, my improved coupling nut A, may be used to great advantage with the present types of supply-pipes which have a fixed collar 1ª, and lead cone packing ring 1ᵇ at one end, but which have no means at the opposite end to prevent blow-outs at such end. Owing to the varying conditions that exist in the different plumbing installations, due to the use of different makes and styles of bath-tubs which differ in height from the floor to the opening formed for the faucet shank, and due also to the fact that the service pipes do not always project through the floor or wall to the same extent, it is practically impossible to provide a commercial supply-pipe with a fixed collar at both ends such as will universally meet the demands of the trade, hence it has been the practice to provide these supply-pipes with a collar at one end only, leaving the other end to be coupled in the usual way, as by a slip-joint coupling nut, but with such a nut there is always present the danger of a blow-out, which my improved coupling nut obviates and which also enables proper penetrating or telescoping adjustments to be made to suit the varying conditions found to exist in the different installations.

From the foregoing description of the device taken in connection with the drawings it will be seen that after the pipes have been properly positioned with reference to one another the coupling nut 3 is tightened up, and this serves to compress the packing ring 6, thereby making a fluid-tight joint. This fluid-tight joint having been made the split gripping ring 13 is placed in proper position, and the locking nut 10 screwed home, which last operation causes the gripping ring 13 to embed itself into the pipe, thereby locking the two pipes into the desired position after the fluid-tight joint has been made.

What I claim is:—

1. In a slip joint coupling, the combination with a pipe having external threads upon its end and a second pipe of reduced diameter telescoping into said first pipe, and having an exterior smooth surface, of a coupling member threaded upon the first pipe and having an inwardly extending flange with a flat face opposed to the end of the externally threaded pipe and adapted for snug engagement against said telescoping pipe, a packing carried in said member against said flat face and adapted to become pressed against said threaded pipe upon the screwing of said member upon the pipe, said member also having an integral threaded extension surrounding the telescoping pipe, said flange having an inclined wall facing outward through the extension, a split ring formed with an annular biting edge and arranged in the extension against the inclined face and a gland nut embracing said telescoping pipe and bearing against said ring, whereby to compress the latter against the inclined face and force said biting edge into frictional contact with the telescoping pipe to securely lock the same against longitudinal movement.

2. In a slip joint coupling and in combination, an outer pipe, a pipe telescoping into said outer pipe, a coupling member secured to the outer pipe and having a straight shoulder facing the end thereof, a packing between the end of the outer pipe and said shoulder and adapted to be compressed against said end by the coupling member, said coupling member also having an inwardly inclined shoulder, a locking member formed with a biting edge and bearing on the inclined shoulder, and a nut on the coupling member engaging the locking member and compressing the same against the inclined shoulder whereby to force said biting edge into frictional contact with said telescoping pipe thereafter and securely lock the same against movement.

3. In a slip-joint coupling and in combination, an outer pipe, a pipe telescoping into said outer pipe, a coupling member secured to the outer pipe and having a straight shoulder facing the end thereof, a packing between the end of the outer pipe and said shoulder adapted to be compressed against said end by the coupling member, said coupling member also having an inwardly inclined shoulder, a locking member formed with a biting edge bearing on the inclined shoulder, and a nut on the coupling member engaging the locking member and compressing the same against the inclined shoulder to force said biting edge into intimate contact with said telescoping pipe whereby to distort the pipe and render the same incapable of longitudinal displacement.

In testimony whereof I have hereunto set my hand in presence of two subscribing witnesses.

ANTON C. SCHUERMANN.

Witnesses:
WILLIAM R. BIDDLE,
LEONARD F. McKIBBEN.